Figure 1:
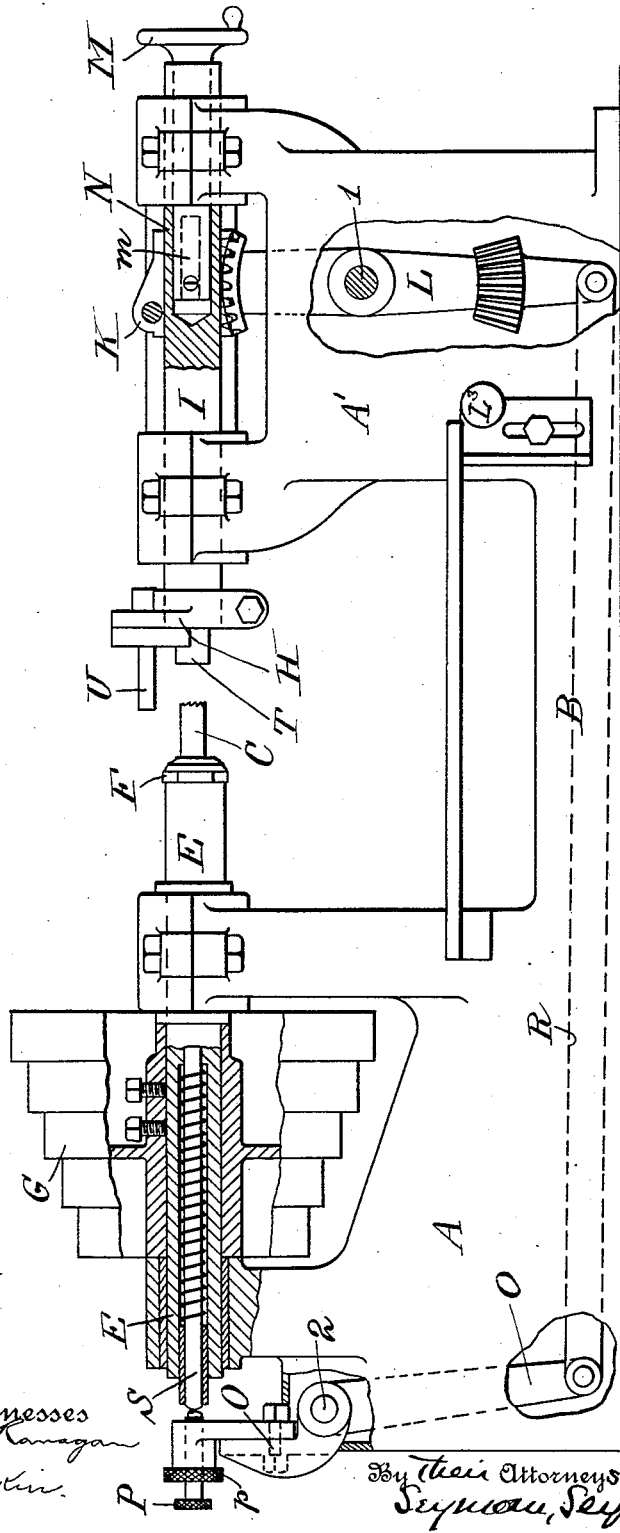

L. W. HOLUB & P. F. DUSHA.
BUTTON BLANK CUTTING MACHINE.
APPLICATION FILED AUG. 22, 1906.

999,031.

Patented July 25, 1911.
2 SHEETS—SHEET 1.

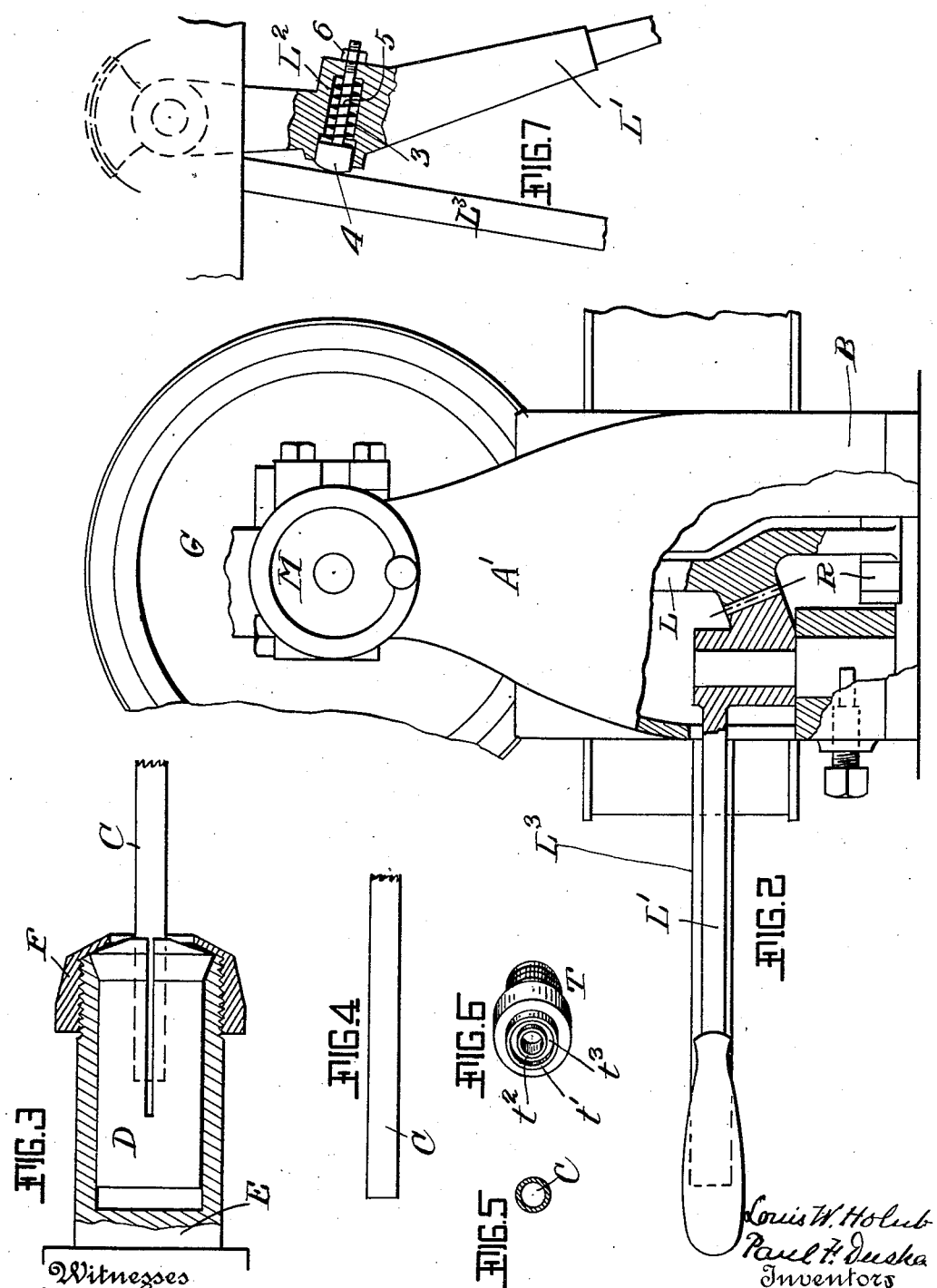

UNITED STATES PATENT OFFICE.

LOUIS W. HOLUB AND PAUL F. DUSHA, OF NEW YORK, N. Y., ASSIGNORS TO HOLUB-DUSHA COMPANY, OF SARATOGA SPRINGS, NEW YORK, A CORPORATION OF NEW YORK.

BUTTON-BLANK-CUTTING MACHINE.

999,031.      Specification of Letters Patent.     Patented July 25, 1911.

Application filed August 22, 1906. Serial No. 331,550.

*To all whom it may concern:*

Be it known that we, LOUIS W. HOLUB and PAUL F. DUSHA, citizens of the United States, and residents of the city, county, and State of New York, have jointly invented certain new and useful Improvements in Button-Blank-Cutting Machines, of which the following is a specification.

Our invention relates to improvements in button blank cutting machines in which a tubular rotating cutter operates in conjunction with a support, and both in conjunction with an improved feed and a simplified blank knock-out device, and the objects of our improvement are: 1. To provide a finished, durable, completely hardened cutting tool perfectly adjusted without machine work in the machine. 2. To provide a double support for the blank and the shell at the same time without wear, coöperating with the cutting tool, and means for steadying the shell and gaging and spacing the cutting. 3. To simplify the knock-out device, make the machine right handed, and to provide a spring stop and dead stop for the feed. 4. To dispense with all expert labor in operating the machine.

Other objects will appear from the hereinafter description.

We attain these objects by the construction illustrated in the accompanying drawings, in which:

Figure 1 is a side view of the complete machine partly in section, showing parts cut away. Fig. 2 is a cross-section through the tail stock. Fig. 3 is a view of the cutting tool and split chuck. Fig. 4 is a side view of the cutting tool. Fig. 5 is a cross-section thereof. Fig. 6 is a perspective view of the double support with groove. Fig. 7 is a view in section of the spring stop and dead stop.

A is the head stock.

A' is the tail stock, both preferably formed integral with the bed piece B.

C is a cutting tool held by the spring chuck D fitting in the end of the hollow spindle E into which it is pressed by the nut F.

G is a step cone pulley driving the hollow spindle E mounted in bearings in the head stock A.

H is a work-stop and guide mounted on the end of the reciprocating bar I by which the shell is advanced toward the cutting tool.

K is a clamp on the reciprocating bar having a motion thereon by means of a slot and pin in a nut in the hollow reciprocating bar I.

L is a gear lever pivoted at 1 to the tail stock A' meshing at the upper end in teeth on the clamp K, by which the clamp and reciprocating bar are advanced and withdrawn when the hand lever L' meshing with the gear lever is moved to the right or left. On the lever L' is the spring stop and dead stop device $L^2$, consisting of a cylinder 3, movable plug 4, spiral spring 5, and adjusting nut 6.

$L^3$ is a fixed hand rest.

M is the hand-wheel rotating the screw $m$ in the nut N.

O is a lever pivoted at 2 on the head stock A carrying an adjusting screw P and locknut $p$ at its upper end actuated from its lower arm by the bar R connecting it with the gear lever L on the tail stock A' by which the gear lever L and the lever O move in unison.

S is a blank knock-out rod in the hollow spindle E, and is held against the adjusting screw P by the spiral spring, not lettered, surrounding the knockout rod.

T is the support screwed firmly into the reciprocating bar I and contains a circular groove $t^3$ on its face of the same size as the cutting tool with clearance, formed of outer and inner concentric hollow cylinders $t'$ $t^2$ so sized and adjusted that the cutting tool may slightly enter the groove $t^3$ but without meeting the metal of the support.

U is a pin in the chuck H for steadying the shell and gaging and spacing the cutting. When the operator desires to cut the first blank from a fresh shell, the edge of the shell is held against the pin U by hand until the support T presses the shell against the cutter C and the cutting begins, and thus the pin U prevents the shell from whirling about the cuttting tool as a center. When the first hole is cut, the pin U is put through that hole and brings the next cut close to the first hole cut without waste of material, and thus the pin U operates as a gage spacing the cutting.

The cutting tool C is a hollow cylinder of steel carefully turned to a uniform size and bored out from a solid piece which is afterward hardened all the way through and has saw teeth filed in the cutting edge. A split cutting tool has been, prior to our invention, employed which is clamped and tightly wedged into the chuck, but this adjustment requires too much labor and expert labor, the blanks cut from the shell are of uneven size and are untrue circles, and this varies and injures the pattern subsequently cut on the button, while the tool itself does not last and easily breaks. In the attempt to avoid this, in pearl button machines the cutting tool was later screwed into the sprindle, had a tube of greater thickness than the finished tool and was bored and turned to the precise thinness and size in the machine and required highly skilled and experienced labor for this first adjustment and manufacture, and as it wore down it required to be further turned and bored in the machine and then taken from the machine and hardened. Our finished tool supplants both these forms and removes all these objections.

In all machines it is desirable that the working lever be on the right. This brings the cutting tool on the right of the operator or else the blank knock-out rod must be operated by a separate lever on the left, and if the cutting tool is on the right it must ordinarily be taken out for filing. To avoid these objections we have reorganized the machine so that the cutting tool may be on the left and may thus be filed and sharpened without removing it from the machine.

We have simplified the blank knock-out device and connected it with the hand-lever on the right, and having made the tool solid and all finished ready for use, hardened all the way through, bored out of a solid piece, it can be worn out as far as it can be used without any removal from the machine even for sharpening or rehardening; and our permanent support does not require shaping and does not have the objections to the wooden support hitherto used.

The hand lever L' in its motion to the left representing the last stage of the cutting through the shell, brings up against a fixed lug on the fixed hand-rest L³ in such wise that the movable plug 4 encounters the stop and by the tension of the spiral spring 5 is retarded as the cutting tool cuts through the outside softer crust of the shell, thus preventing in unskilled hands the cutting tool from breaking through the shell and roughing the edge of the cut and of the button blank. As the hand lever is moved still farther to the left against the tension of the spring 5, the movable plug encounters the shoulders in the cylinder 3 and comes to a dead stop at the point where the cutting tool has fully completed the cut.

In operating our machine we adjust the cutting tool C in the spring chuck D so that it will project from the spring chuck a little more than the thickness of the shell to be cut, adjust the blank knock-out rod in the hollow spindle by the adjusting screw P so that in its first position its end will be wholly within the cutting tool but near the teeth. The reciprocating rod I is then adjusted by means of the clamp K and the hand-wheel M, so that the cutting tool in the advanced position of the support may slightly enter the circular groove $t^3$ in the support. By the hand lever L' the reciprocating rod has a forward and back motion somewhat greater than the thickness of the shell, and through the gear lever L, bar R and lever O the reciprocating bar bearing the chuck and shell advances toward the cutting tool as the blank knock-out rod S recedes within the hollow cutting tool; and similarly as the reciprocating bar I recedes, the blank knock-out rod S advances within the cutting tool and ejects the button blank.

Through a belt not shown driving the step cone pulley G, the hollow spindle E bearing the split chuck and the cutting tool is rapidly rotated, the shell to be cut is placed against the support T by the left hand of the operator and against the pin U in the chuck D when, by the right hand of the operator, the reciprocating bar I, and the chuck D bearing the support T backing the shell, are uniformly advanced toward the cutting tool which by its rotation cuts the button blank from the shell, and throughout the operation and especially when the tool breaks through the shell, both the shell and the blank are firmly and evenly supported within and without by the concentric cylinders of the support, and the tool emerges in the groove of the support without roughing either the edge of the blank or the shell. On finishing the cut, the hand lever L' is moved toward the right, withdrawing the chuck and the shell and advancing the blank knock-out rod within the cutting tool to eject the button blank. By moving the shell this operation is indefinitely repeated.

What we claim as our invention and desire to secure by Letters Patent is:—

1. In a button cutting machine, the combination of a grooved support comprising two concentric ribs spaced apart, and a tubular cutting tool adapted to approach the groove of the support.

2. In a button blank cutting machine, a rotary tubular cutting tool held against longitudinal movement, a work-support coöperating therewith, a knockout rod adapted to clear the button blanks from the tool, a lever connected to said support and adapted to move the latter toward and from said tool, and connecting means between said lever and said knockout rod whereby said support and said knockout rod are adapted to be moved by said lever.

3. In a shell button blank cutting machine, the combination of a cutting tool and a support coöperating therewith and one of said parts being movable toward and from the other, an operating lever connected with said movable part so as to actuate the same, and a spring stop for said lever adapted yieldingly to resist the movement of the lever at the end of its operating stroke, to lighten the pressure of the cutting tool upon the work while cutting the outer soft shell.

4. In a button cutting machine, the combination of a cutter for cutting out button blanks and a support having an annular groove arranged to register with the cutter, with means whereby a relative feeding movement may be produced between the cutter and the support, an abutment, a spring so arranged as to become effective to check the movement of the movable element as the cutter and groove approach, and a dead stop arranged to co-act with the abutment and stop the movable member after the cutter has entered the groove.

5. A blank cutting machine, comprising a framework, a feed shaft and a cutter shaft mounted in longitudinal alinement in the framework, means for imparting a longitudinal movement to the feed shaft, the cutter shaft being tubular, a blank ejecting pin mounted in said cutter shaft, and a connection between the blank ejecting pin and the feed shaft moving means arranged to effect a forward movement of the pin upon a rearward movement of the feed shaft.

6. A blank cutting machine, comprising a framework, a feed shaft and cutter shaft arranged in longitudinal alinement with each other in the framework, a lever having a connection with said feed shaft and fulcrumed in the framework, an ejecting pin mounted in the cutter shaft, a rocker arm pivotally mounted in the framework and adapted to move said ejecting pin, a connection between said rocker arm and said lever, and means for swinging said lever.

7. A blank cutting machine, comprising a framework, a cutter shaft journaled in said framework, a feed shaft mounted in the framework and arranged to be moved toward and away from the cutter shaft, and means for yieldingly retarding the movement of the feed shaft toward the cutter shaft only near the completion of said movement.

8. A blank cutting machine comprising a framework, a feed shaft, and a cutter shaft mounted in said framework, means for imparting a longitudinal movement to the feed shaft, a blank ejecting means carried by said cutter shaft, and a connection between the blank ejecting means and the feed shaft moving means arranged to effect a forward movement of the blank ejecting means upon a rearward movement of the feed shaft.

9. A blank cutting machine comprising a framework, a cutter shaft journaled in said framework, a feed shaft mounted in the framework and arranged to be moved toward and away from the cutter shaft, means for imparting a free initial movement to the feed shaft toward the cutter shaft, and a spring arranged to oppose such free movement only near the completion of such movement.

In witness whereof, we have hereunto set our hands at the city, county and State of New York, this 26th day of July, 1906.

LOUIS W. HOLUB.
PAUL F. DUSHA.

In presence of—
HENRY BOWING,
GUSTAV SCHARWASHTER.

---

Copies of this patent may be obtained for five cents each, by addressing the "Commissioner of Patents, Washington, D. C."